United States Patent Office 3,425,945
Patented Feb. 4, 1969

3,425,945
NOVEL ZINC MANGANESE ARSENIDE SEMICONDUCTING MATERIALS
George Augustus Castellion, Stamford, Conn., assignor to American Cyanamid Company, Stamford, Conn., a corporation of Maine
No Drawing. Filed May 26, 1966, Ser. No. 553,011
U.S. Cl. 252—62.51                5 Claims
Int. Cl. H01f 1/04, 1/06

The present invention relates to novel semiconducting compositions of matter. More particularly, it relates to novel single phase, semiconducting, magnetic type compositions of matter having a hexagonal crystal structure. Still more particularly, the invention is concerned with hexagonal crystal structures having the formula:

$$Zn_{3-x}Mn_xAs_2$$

wherein $x$ is a value ranging from about 2.1 to about 2.9.

Solid state semiconductors are well known. They are characterized usually by a crystalline configuration. Such materials can be subjected to electrical or magnetic fields, to wave radiation or to diverse environments for producing electrical, photoelectrical or optical effects. Semiconductors are employed in diverse devices, such as transistors, diodes, photocells, photoconductors, rectifiers, thermocouples or thermoelectric generators. In all such devices, it is rare to find a crystalline, semiconducting material which similarly exhibits spontaneous magnetization. The latter is highly desirable, since, for instance, solid state semiconductors, if they possess spontaneous magnetization, can be utilized in the storage and retrieval of information using electron beam writing and nondestructive magneto-optical readout.

Although many solid state semiconductors are known, the property of spontaneous magnetization is generally not attributed to them. For instance, compounds of the formula: $Zn_{3-x}Mn_xAs_2$, where $x$ is a value between 0.50 and 2.00, are disclosed as semiconductors in the Journal of the Physical Society, Japan, vol. 18, at pp. 1221-1222 (1963). Unfortunately, such compounds are described in detail as tetragonal in crystal structure and as being antiferromagnetic. As such, the properties attributable to the compounds described in the aforementioned publication cannot be employed as a component for a device in the retrieval of information or in a readout structure referred to hereinabove.

It is, therefore, a principal object of the invention to provide a semiconducting material possessing simultaneous magnetic properties. It is a further object of the invention to provide a straightforward process for preparing such semiconducting materials which are both magnetic and are of a single phase. Other objects will become apparent to one skilled in the art from a reading of the ensuing description.

In accordance with the invention, it has been found that compositions of matter having the formula:

$$Zn_{3-x}Mn_xAs_2$$

wherein $x$ is a value between about 2.1 and about 2.9 and, preferably, between 2.2 and 2.8, can be prepared in a simple straightforward manner to obtain compositions of matter exhibiting spontaneous magnetization and which are of (a) a single phase, (b) hexagonal crystal structure, and (c) semiconducting. The property of spontaneous magnetization is observed over a wide range of temperatures, namely, below 70° K. and as high as about 170° K.

In preparing the hexagonal crystal structures characterized by the formula hereinabove, the elements are individually ground to a particle size which can be easily manipulated. Working with arsenic, it is a preferred practice that the particle size should be less than six millimeters in diameter and preferably in the range of about one millimeter in diameter. Similarly, the elements, zinc and manganese, should be ground to small millimeter diameters, usually in the range of from about one to about 10 millimeters. The elements are then mixed in the required stoichiometric amounts, introduced into a crucible which is evacuated and sealed and then subjected to elevated temperatures. This is usually done by placing the crucible containing the mixed elements into a furnace and heating the crucible and contents to a temperature above the melting point of the material or composition of matter to be prepared. In general, a temperature of from about 700° C. to about 1100° C. will be required to accomplish this end. Depending on the temperature employed, the time required to liquefy and fuse the elements commencing at room temperature ranges from about thirty minutes to three hours. For most preparations, a time of about one hour appears to be the upper limit.

The temperatures employed are sufficient as to liquefy the elements present. In this state, the elements are intimately mixed by rocking the crucible-containing furnace. Uniformity of product is thereby achieved. Thereafter, the contents in the crucible are cooled at rates ranging from approximately 2° C. to 20° C. per hour and this rate of cooling is continued until a temperature of about 400° C. is reached. At this point, the cooling rate is increased to from 80° C. to 100° C. per hour. Utilizing this technique, which is simpler than the crystal pulling technique normally employed in the art, it has been found that single crystal growth is achieved.

Advantageously, the products prepared in accordance with the process hereinabove disclosed are found to be found in single phase by microscopial and X-ray analysis. In X-ray analysis, for instance, X-ray diffraction patterns are made on powdered samples to establish unequivocally their single phase.

The following examples are presented merely by way of illustration and are not to be deemed limitative of the present invention. The properties of the products prepared in the examples below are determined in the manner set forth in U.S. Letters Patent No. 3,211,517, which is incorporated by reference herein.

EXAMPLE 1

Stoichiometric quantities of zinc, manganese and arsenic which correspond to the compound: $Zn_{0.9}Mn_{2.1}As_2$ are admixed in the following manner:

Into a crucible of quartz tubing 2.7233 grams of zinc and 5.3406 grams of manganese are placed. The latter is evacuated to a pressure of less than about $1 \times 10^{-3}$ mm. Hg. Thereafter, 6.9360 grams of arsenic under a nitrogen atmosphere are introduced in the side arm of the quartz tubing. The crucible is again evacuated to a pressure of less than $1 \times 10^{-3}$ mm. Hg.

A resistance furnace which can be gently rocked is employed to receive the crucible and contents which are sealed therein and the temperature of the furnace was raised from room temperature to about 1000° C. The furnace is gently rocked for about 3 hours after the temperature reached 1000° C. in the furnace. Thereafter, the rocking is terminated and the temperature of the furnace was gradually decreased at a rate of about 5° C. per hour. After 24 hours, the power to the furnace was completely terminated and the furnace was allowed to cool to room temperature.

Examination of the product recovered from the crucible indicated that the product was of a single phase both by microscopial as well as X-ray analysis. From the measurement of the magnetic susceptibility versus temperature, the product exhibited spontaneous magnetization below a temperature of 90° K. Further, at room temperature, resistivity is found to be 6.4 ohm-centimeter and the Seebeck coefficient is found to be $286 \times 10^{-6}$ v./° C.

EXAMPLE 2

Preparation of the compound: $Zn_{0.8}Mn_{2.2}As_2$

In repeating the procedure of Example 1 in every detail except that 3.2381 grams of zinc, 7.4839 grams of manganese and 9.2778 grams of arsenic are employed in lieu of the quantities of these elements used therein, a product exhibiting spontaneous magnetization below 150° K. is obtained. The resistivity and Seebeck coefficient are respectively as follows: 45 ohm-centimeter, $370 \times 10^{-6}$ v./° C.

EXAMPLE 3

Preparation of the compound: $Zn_{0.5}Mn_{2.5}As_2$

The procedure of Example 1 is repeated in every detail except that 1.0218 grams of zinc, 4.2939 grams of manganese and 4.6843 grams of arsenic are employed at an increased reaction temperature ranging from 1000° C. to 1050° C. There is similarly found an hexagonal crystal structure which exhibits spontaneous magnetization below 170° K. and possessing a resistivity of 8 ohm-centimeter and a Seebeck coefficient of $550 \times 10^{-6}$ v./° C.

EXAMPLE 4

Preparation of the compound: $Zn_{0.2}Mn_{2.8}As_2$

Example 1 is repeated in every detail except that 0.6191 gram of zinc, 7.2850 grams of manganese and 7.0959 grams of arsenic are reacted. Again, a single phase, semiconducting material of hexagonal crystal structure is obtained, possessing a resistivity of 10 ohm-centimeter and a Seebeck coefficient of $450 \times 10^{-6}$ v./° C., and exhibiting spontaneous magnetization below 195° K.

I claim:
1. A semiconducting, hexagonal crystal structure exhibiting spontaneous magnetization and having a single phase having the formula:

$$Zn_{3-x}Mn_xAs_2$$

wherein $x$ is a value ranging from about 2.1 to about 2.9.

2. The composition of matter according to claim 1 wherein $x$ is a value equal to 2.1.
3. The composition of matter according to claim 2 wherein $x$ is a value equal to 2.5.
4. The composition of matter according to claim 3 wherein $x$ is a value equal to 2.8.
5. The composition of matter according to claim 4 wherein $x$ is a value equal to 2.2.

References Cited

UNITED STATES PATENTS 3,211,517  10/1965  Castellion _____ 252—62.3 X

OTHER REFERENCES

Kasaya et al.: "Chemical Abstracts," vol. 61, p. 15511 (1964).

TOBIAS E. LEVOW, *Primary Examiner.*

J. COOPER, *Assistant Examiner.*

U.S. Cl. X.R.

23—315; 136—240; 252—62.3, 500, 501, 518, 519